United States Patent [19]

Yuda

[11] Patent Number: 4,723,806
[45] Date of Patent: Feb. 9, 1988

[54] PARALLEL ROBOTIC GRIPPER

[76] Inventor: Lawrence F. Yuda, P.O. Box 176, Westminster, S.C. 29693

[21] Appl. No.: 19,965

[22] Filed: Feb. 27, 1987

[51] Int. Cl.[4] .............................................. B25J 15/08
[52] U.S. Cl. .................................... 294/119.1; 294/88; 901/37; 901/39
[58] Field of Search ............ 294/67.33, 86.4, 88, 294/93, 94, 103.1, 116, 119.1; 269/32, 34, 217, 229, 233; 279/110, 121, 123; 901/31, 36–39

[56] References Cited

U.S. PATENT DOCUMENTS

| | | | |
|---|---|---|---|
| 4,336,926 | 6/1982 | Inagaki et al. | 294/119.1 X |
| 4,403,897 | 9/1983 | Willis | 294/119.1 X |
| 4,518,187 | 5/1985 | Blatt et al. | 294/119.1 X |
| 4,591,198 | 5/1986 | Monforte | 294/119.1 X |
| 4,607,873 | 8/1986 | Nusbaumer et al. | 294/88 |

FOREIGN PATENT DOCUMENTS

| | | | |
|---|---|---|---|
| 3325921 | 1/1985 | Fed. Rep. of Germany | 294/119.1 |
| 18165 | 2/1978 | Japan | 294/119.1 |
| 22659 | 2/1979 | Japan | 294/119.1 |
| 831613 | 5/1981 | U.S.S.R. | 901/39 |

*Primary Examiner*—Johnny D. Cherry
*Attorney, Agent, or Firm*—Bailey & Hardaway

[57] ABSTRACT

A parallel robotic gripper is illustrated having a vertically moveable member for opening and closing parallel gripping members which are carried on master jaws having lateral longitudinally extending slots therein for minimizing machining necessary to provide effective mounting for the slideable master jaws on longitudinally aligned horizontally spaced rails.

3 Claims, 6 Drawing Figures

PARALLEL ROBOTIC GRIPPER

BACKGROUND OF THE INVENTION

Grippers having the usual fingers which are opened and closed in a generally V-shape relation by means of a power operated actuator are illustrated in U.S. Pat. Nos. 4,167,134, 4,211,123, 4,234,223, 4,492,400 and 4,566,727. Parallel grippers have also been provided utilizing a variety of means for forcefully moving upright parallel gripping members into and out of gripping relation to each other. It is common practice to use a vertically movable cam means for imparting movement to gripping members. Alternatively, linkage means may be utilized rather than a cam for operating the grippers. It is also common practice to utilize longitudinal rails integrally carried by longitudinal side members for supporting a pair of opposed parallel master jaws. Such constructions are expensive, requiring extensive machining.

While square or rectangular cross-sections may be utilized, it is desirable to utilize parallel horizontally spaced mounting bars or rails of circular configuration, because such are less expensive and provide a simple more reliable structural arrangement. The use of parallel circular rails may itself be costly due to the accuracy of alignment required for positioning the gripper mounting blocks or master jaws. Close tolerances would ordinarily be required in providing bores in the mounting blocks which are adapted to receive the rails. Moreover, the means for applying gripping force to the vertical grippers is such that it has generally been impossible to move the grippers into close relationship to each other.

An object of this invention is to provide means for facilitating forceful movement of the parallel grippers through the use of a vertical cam having slots which converge upwardly for accommodating connectors carried by gripper mounting blocks positioned upon end mounted rails.

An important object of the invention is the provision of lateral slots within gripper mounting blocks for accommodating a pair of parallel horizontally spaced circular bars or rails. The rails are positioned upon end brackets without the need for great accuracy in alignment because at least one lateral slot is carried in each of the master jaws permitting some misalignment of the rails. Likewise, minimal machining and alignment of the openings in the blocks is necessitated. Preferably, a bore is provided for one of the parallel rails while one such slot is provided for the other parallel rail.

SUMMARY OF THE INVENTION

It has been found that parallel grippers may be provided having more reliable and inexpensive operating parts through the use of a vertically moveable cam having upwardly converging guide slots for moving the master jaws for the grippers in and out in relation to each other. Spaced circular mounting and guiding rails may be provided for the master jaws by utilizing end brackets for positioning parallel rails to be received in bores carried in the master jaws so as to minimize alignment requirements for the rails and machining requirements for the bores in the master jaws. Lateral slots extend from the bores to reduce the otherwise close tolerances which would be required for accommodating the end mounted rails.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a robotic gripper having opposed parallel gripping jaws carried between end brackets A carried adjacent opposite ends of the gripper. A pair of parallel horizontally spaced rails B are carried by said end brackets. A pair of opposed master jaws C each carrying a respective gripping jaw are positioned by the rails for horizontal sliding movement in relation to each other. A pair of spaced openings D are provided within the master jaws through which respective rails pass for positioning the master jaws on the rails for sliding movement. At least one of the spaced openings has a longitudinal slot E extending laterally of the adjacent said rail. Power operated means F effects sliding movement of the master jaws toward and away from each other. The power operated means F includes a vertical cam having upwardly converging slots therein. Means are carried by the master jaws slidable in respective upwardly converging slots, and a fluid operated cylinder forcefully moves the cam vertically for moving the jaws into and out of gripping relation.

Figure 1:
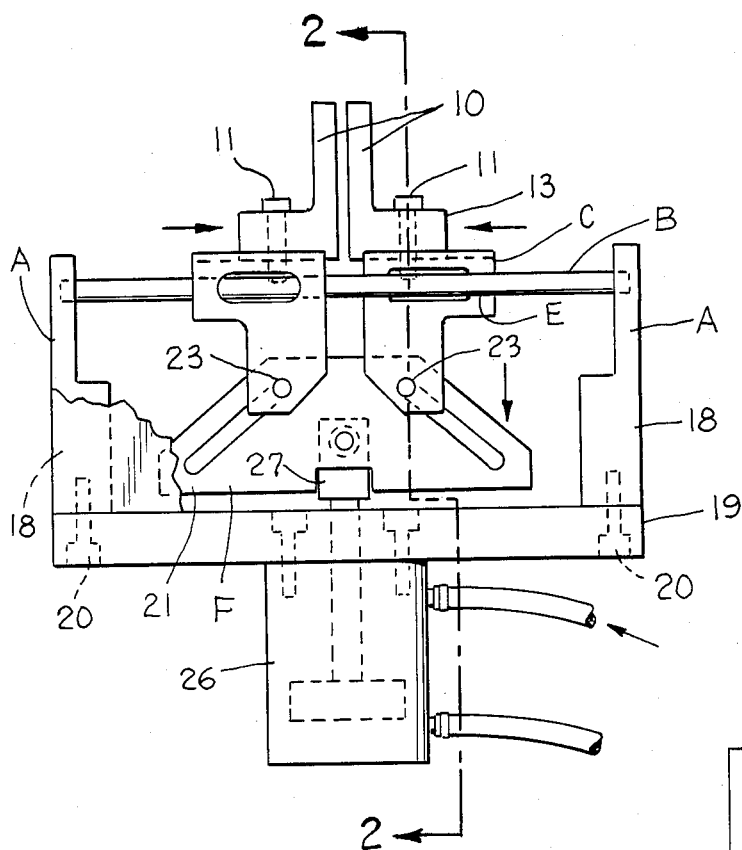
FIG. 1 is a front elevation illustrating a gripper wherein a vertically moveable cam is provided for forcefully moving gripper mounting blocks carried on parallel circular rails in accordance with the invention.
Figure 2:
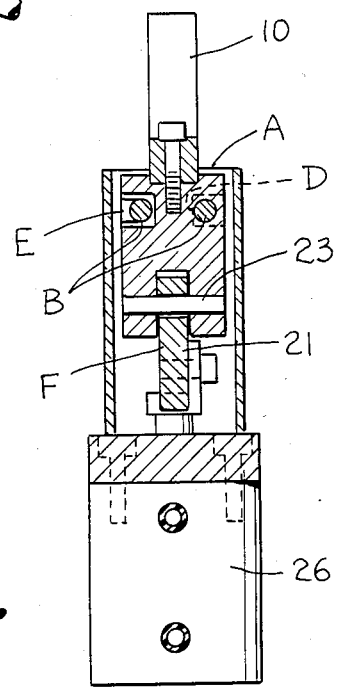
FIG. 2 is a transverse sectional elevation taken on the line 2—2 in FIG. 1.
Figure 3:
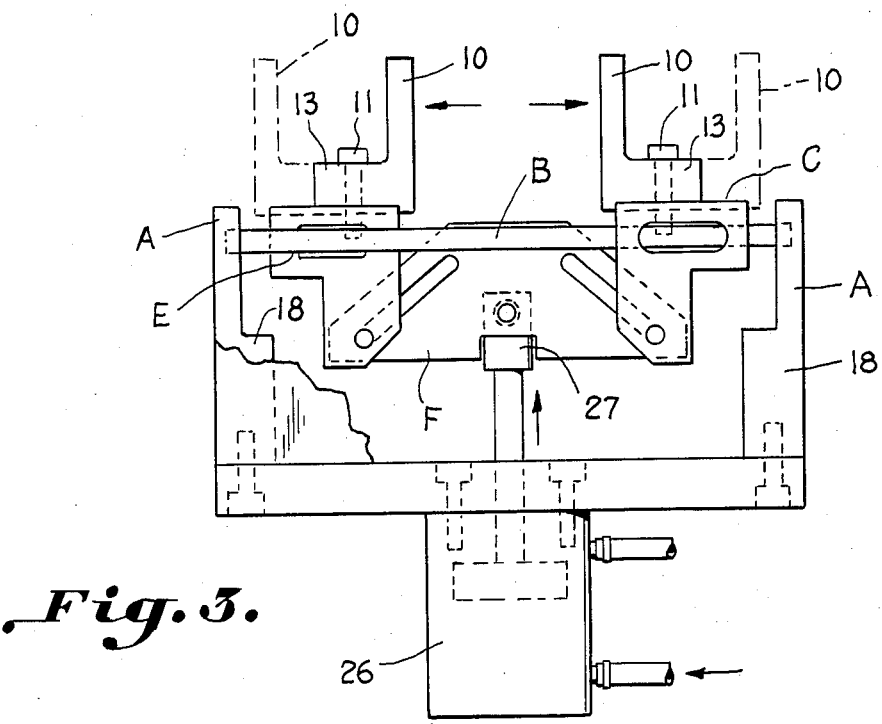
FIG. 3 is a front elevation illustrating the apparatus with the grippers in open position.
Figure 4:
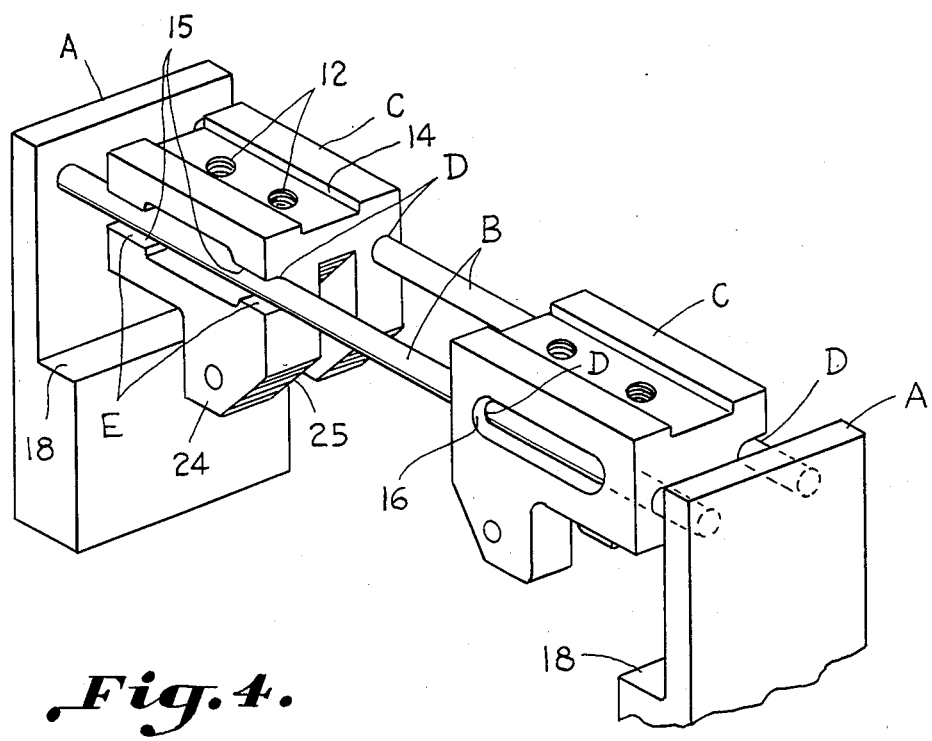
FIG. 4 is a perspective view illustrating the rail mounting arrangement for the gripper mounting blocks.

The robotic gripper is illustrated as having a pair of spaced vertical jaws 10 which are illustrated as being in outside diameter gripping relation closely adjacent each other in FIG. 1. The gripping of inside diameters also may be provided. If desired the jaws 10 may be mounted so as to engage each other through suitable positioning upon the master jaws by the threaded fastening members 11 which are carried in the threaded openings 12. A bracket 13 which is illustrated as being integral with the vertical jaws 10 is carried within the aligned channels 14 in an upper surface of the master jaws. The master jaws may accommodate the vertical grippers in the fashion illustrated in broken lines in FIG. 3 wherein a wider workpiece may be accommodated to be gripped by the parallel jaws.

A pair of end brackets A carry the horizontally spaced rails B which in turn position the opposed mounting blocks C. The master jaws C are provided with aligned bores D for accommodating the guide rails. Laterally extending slots E extend from the bores D, and at least one of the slots has openings in the end portion thereof as illustrated at 15. The other of the respective slots in each of the master jaws is closed as at 16 to provide internal machined guiding surfaces for mounting and guiding the master jaws C on the rails B.

The rails B are carried within opposed end brackets A having an enlarged mounting bore 18 which is carried upon a base plate 19 by suitable threaded fastening means 20. Power operated means F is illustrated as including a vertical cam with connector means for forcefully urging the master jaws into and out of gripping relation with each other. The cam plate 21 includes guide slots 22 which converge upwardly so as to accommodate a pin 23 carried by depending master jaws. If desired the pin may be provided with anti-friction means such as a roller (not shown). The depending members 24 of the master jaws C are spaced as at 25 to accommodate the vertical cam therein. Driving means such as the air cylinder 26 operates clevis bracket 27 carried thereby.

Figure 5:
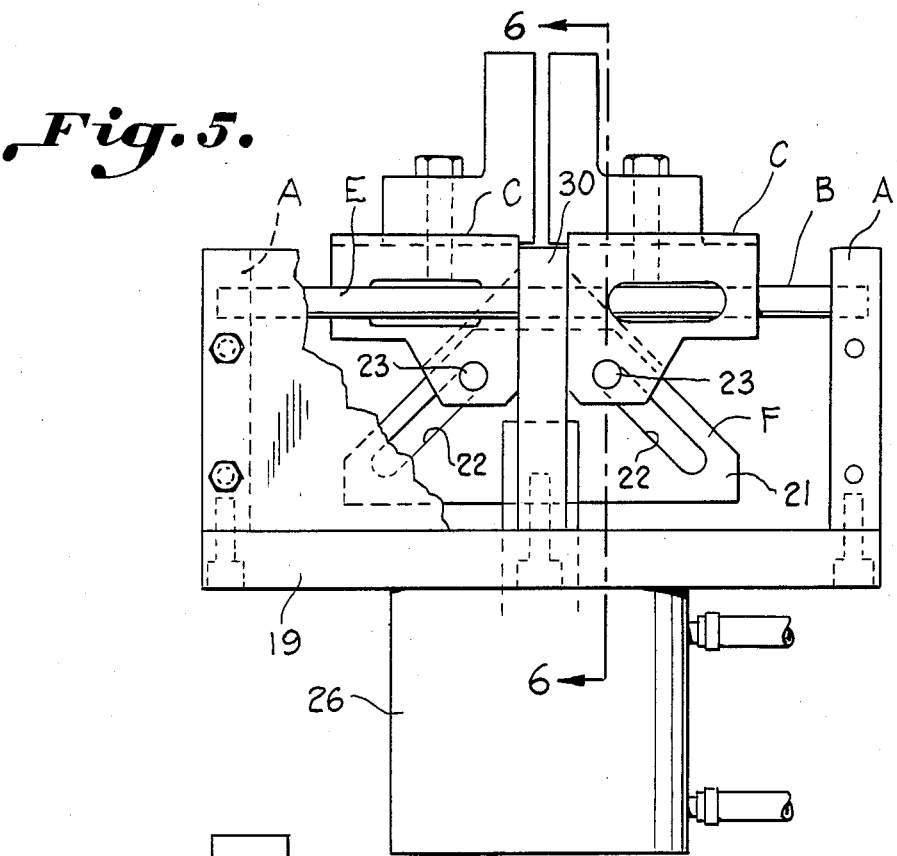
FIG. 5 is a front elevation illustrating a modified form of the invention.
Figure 6:
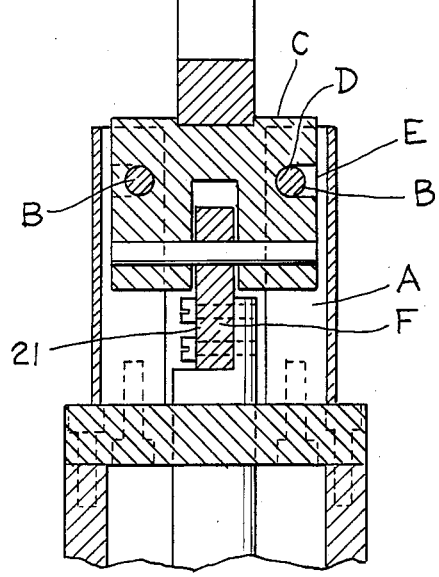
FIG. 6 is a transverse sectional elevation taken on the line 6—6 in FIG. 5.

FIGS. 5 and 6 illustrate a modified form of the invention wherein an intermediate mounting bracket 30 is provided between the end mounting brackets A so as to provide greater support for the parallel rods or rails B when spanning more substantial distances or wherein greater stability is required.

While a preferred embodiment of the invention has been described using specific terms, such description is for illustrative purposes only, and it is to be understood that changes and variations may be made without departing from the spirit or scope of the following claims.

What is claimed is:

1. A robotic gripper having opposed parallel gripping jaws comprising:
   an end bracket carried adjacent each opposite end of said gripper;
   a pair of parallel horizontally spaced rails carried at each end by a said end bracket;
   a pair of opposed master jaws each carrying a respective gripping jaw positioned by said rails for horizontal sliding movement in relation to each other;
   a pair of spaced openings within said master jaws through which respective rails pass for positioning said master jaws on said rails for said sliding movement;
   at least one of said spaced openings having a longitudinal slot extending laterally of the adjacent rail; and
   power operated means for effecting said sliding movement of said master jaws toward and away from each other;
   wherein movement of said master jaws toward and away from each other effectuates closing and opening of said gripping jaws.

2. The structure set forth in claim 1 wherein said rails are circular, and wherein at least one of said openings in each of said master jaws has a slot extending laterally of said rail.

3. The structure set forth in claim 2 wherein each of said openings is a bore.

* * * * *